UNITED STATES PATENT OFFICE.

ALONZO P. CUTHRIELL, OF PORTSMOUTH, VIRGINIA, ASSIGNOR OF TWO-THIRDS TO CHARLES A. McLEAN AND HARRY L. MAYNARD, OF PORTSMOUTH, VIRGINIA.

METHOD OF COATING SHIPS' BOTTOMS OR OTHER OBJECTS.

SPECIFICATION forming part of Letters Patent No. 716,678, dated December 23, 1902.

Application filed September 12, 1902. Serial No. 123,163. (No specimens.)

*To all whom it may concern:*

Be it known that I, ALONZO P. CUTHRIELL, a citizen of the United States, residing at Portsmouth, in the county of Norfolk and State of Virginia, have invented new and useful Improvements in Methods of Coating Ships' Bottoms or other Objects, of which the following is a specification.

This invention relates to certain new and useful improvements in method of coating ships' bottoms or other objects.

The invention aims to provide a method particularly adapted for painting ships' bottoms to prevent the corroding and fouling thereof.

The method is carried out as follows: The object to be coated is suitably cleaned and then covered with an anticorrosive composition consisting of dry brown ferric oxid, eleven pounds; dry oxid of zinc, four pounds; shellac varnish, eight gallons; raw linseed-oil, two and one-fourth gallons; turpentine, one gallon; oil of pine-tar, one and one-half gallons. This composition is suitably combined in substantially the proportions specified. After the object has been covered with the anticorrosive composition the latter is allowed to become thoroughly dried, and it is then coated by an antifouling composition consisting of dry bright Venetian red, ten and one-fourth pounds; shellac varnish, four and one-fourth gallons; raw linseed-oil, three and one-half pints; red precipitate of mercury, three pounds; arsenious acid, one pound. The ingredients forming the antifouling composition are suitably combined in the proportions substantially as specified.

The ship's bottom when coated by the foregoing method will not corrode and will be prevented from having marine bodies adhere thereto.

It is thought the many advantages of the method herein set forth for painting ships' bottoms or other objects to prevent the same from corroding and from fouling can be readily understood from the foregoing description, and it will also be evident that the specified proportions of the ingredients forming the anticorrosive or antifouling composition can be changed without departing from the general spirit of the invention, which consists in suitably coating the object first with an anticorrosive composition comprising substantially the ingredients set forth and then coating it with an antifouling composition comprising the ingredients substantially as set forth.

Having thus fully described my invention, what I claim as new, and desire to secure by Letters Patent, is—

1. A method of coating ships' bottoms and other objects consisting of applying an anticorrosive composition thereto consisting of ferric oxid, oxid of zinc, shellac varnish, linseed-oil, turpentine and oil of pine-tar, drying the said coating, and then applying a coating of an antifouling composition.

2. A method of coating ships' bottoms which consists in applying an anticorrosive composition thereto, thoroughly drying the same, and then applying to the said anticorrosive coating an antifouling composition consisting of Venetian red, shellac varnish, linseed-oil, red precipitate of mercury, and arsenious acid.

3. A method of coating ships' bottoms which consists in applying an anticorrosive composition thereto consisting of ferric oxid, oxid of zinc, varnish, linseed-oil, turpentine and oil of pine-tar, thoroughly drying said composition and then applying an antifouling composition consisting of Venetian red, varnish, linseed-oil, red precipitate of mercury, and arsenious acid.

In testimony whereof I have hereunto set my hand in presence of two subscribing witnesses.

ALONZO P. CUTHRIELL.

Witnesses:
N. L. BOGAN,
GEO. W. REA.